March 24, 1959
S. G. JOHNSON
2,878,577
GAGE FOR ROTATING TEST PART FOR PERIPHERAL
AND CONCENTRICITY GAGING
Original Filed Nov. 21, 1951
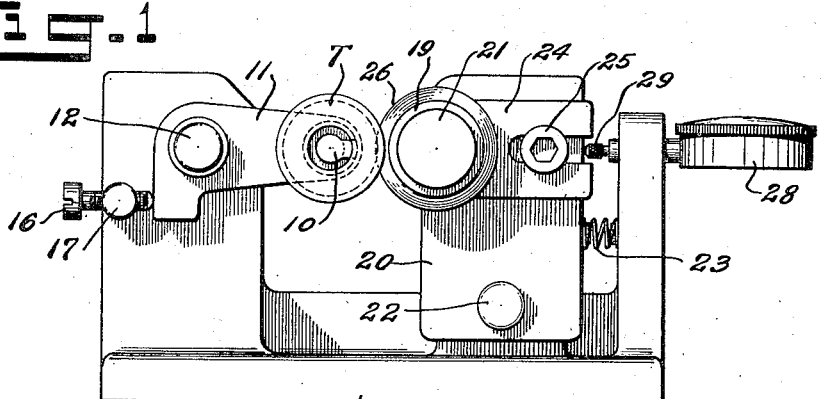
Fig. 1
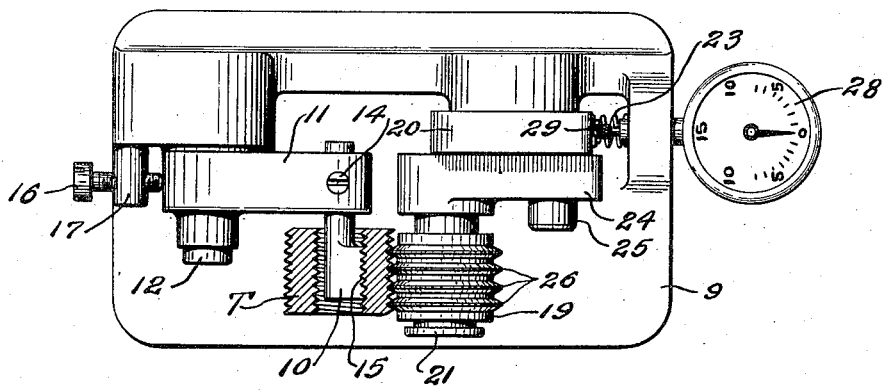
Fig. 2
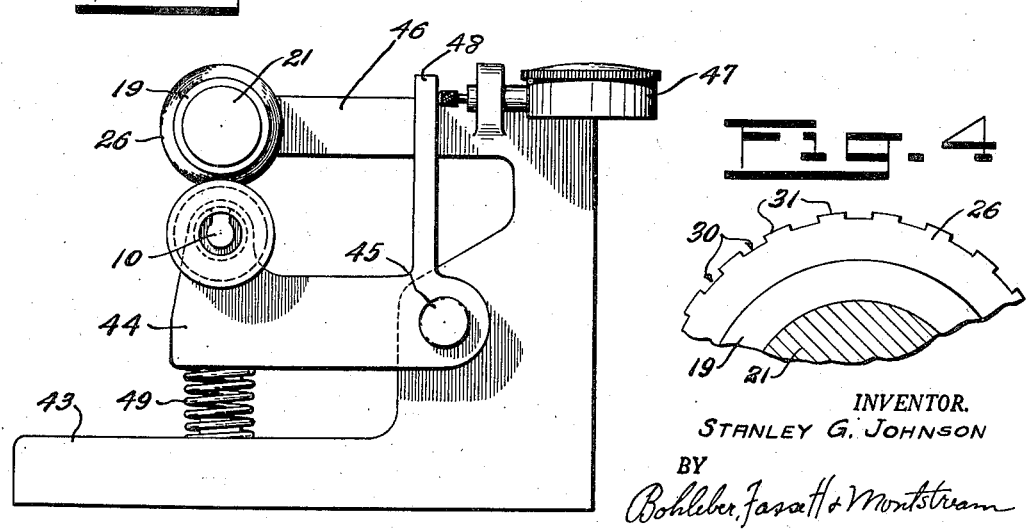
Fig. 3
Fig. 4
INVENTOR.
STANLEY G. JOHNSON
BY
Bohleber, Jasaff & Montstream
ATTORNEYS

United States Patent Office 2,878,577
Patented Mar. 24, 1959

2,878,577

GAGE FOR ROTATING TEST PART FOR PERIPHERAL AND CONCENTRICITY GAGING

Stanley G. Johnson, West Hartford, Conn., assignor, by mesne assignments, to The Johnson Gage Development Company, Bloomfield, Conn., a corporation of Connecticut Original application November 21, 1951, Serial No. 257,589, now Patent No. 2,770,050, dated November 13, 1956. Divided and this application August 28, 1956, Serial No. 606,748

8 Claims. (Cl. 33—199)

The invention relates to a gage of relatively inexpensive construction having cooperating gaging means which support a test part in gaging position, the test part having an internal and an external surface. The gage gages centricity between the internal and external surface, either of which or both may be plain or threaded. One of the gaging means is a gaging roll having means for rotating the roll. Rotation of the gaging roll in turn rotates the test part in gaging position.

An object of the invention is to construct a gage of simple form which tests for the centricity between exterior and interior portions or surfaces of a test part throughout the circumference thereof.

Another object is to construct a gage for testing the centricity between an internal surface and an external threaded surface with a gaging roll having thread gaging ridges which are serrated.

Other objects of the invention will be more apparent from the following description when taken in connection with the accompanying drawings illustrating preferred embodiments of the invention in which:

Figure 1 is a side view of a gage showing the gaging means as used for testing the centricity between an internal surface, shown as threaded, and an external surface, also shown as threaded;

Figure 2 is a partial plan view of the gage of Figure 1;

Figure 3 is a modified form of gage; and

Figure 4 is an enlarged view of a portion of the gaging roll.

This application is a division of the Stanley G. Johnson application Serial No. 257,589 filed November 21, 1951, now Patent No. 2,770,050, issued November 13, 1956.

The simpler form of gage herein is one which provides gaging means which supports the test part in gaging position and one of the gaging means is a gaging roll mounted for rotation and having peripheral means to rotate the roll. Rotation of the gaging roll in turn rotates the test part when in gaging position thereby presenting the entire circumference of the test part to the gaging means without requiring removal of the test part from gaging position and its reinsertion. Many test parts are too small to be turned with the fingers when in gaging position and heretofore had to be removed from gaging position, then turned and reinserted into the gage in order to test another portion of the test part. Also some test parts are too short in that their length is coextensive with the length of the gaging means and likewise had to be removed from gaging position in order to present another part of the test part to the gaging means. Again it is desirable to turn a threaded test part to assure proper seating of the gaging means into a thread.

Figures 1 and 2 illustrate one form of construction for testing the centricity, i.e. concentricity, or eccentricity between an exterior thread surface and an internal thread or surface of a test part T, threaded surfaces being particularly shown. A base or gage frame 9 is provided for mounting the gage parts. The internal gaging means may be a pin 10 carried by a pivoted frame 11 mounted upon a pivot 12 carried by the gage frame. The pin is secured to the pivoted frame by a lock screw 14 and carries a gaging surface 15 which is a lateral extending peripheral portion of a corresponding or mating external screw thread. Stop means in the form of a stop screw 16 threaded through a projection 17 limits the pivotal movement of the pivoted frame to gaging position for the gaging means.

A second or cooperating gaging means is mounted for movement towards and away from the test part T or the pivotally mounted gaging means 10, 15 when in gaging position as shown in Figure 1. The cooperating gaging means includes at least one gaging roll 19 mounted for rotation on a stud or pivot 21 and with a movable frame mounted in any suitable fashion for movement toward and from the test part T or the gaging means 10, 15. The movable mounting particularly shown is provided by a second pivoted frame 20 mounted on a pivot 22 carried by the gage frame 9. A spring 23 is used to project the movable frame and hence the gaging means carried thereby toward the gaging means 10, 15 at gaging position. The gaging roll 19 may be adjustable upon the pivoted frame 22 by being carried upon a slide 24 mounted upon the pivoted frame and clamped in position by a screw 25. For gaging screw threads on a test part, the gaging means has gaging ridges 26 to engage the thread. The gaging means is mounted in parallel relation with the gaging surface 15 to engage a test part supported between the gaging means.

A dial indicator 28 is used to indicate the position of the pivoted frame 20 by having its operating point 29 contacting therewith which, therefore, indicates the position of the gaging means or roll 19. The indicator indicates whether or not the test part T is the same as or differs from a master or perfect part and if different, it is within the allowable tolerances as to wall thickness. When the test part is rotated while in gaging position the indicator will indicate the centricity and other faults.

The test part is placed upon the gaging means 10 and the pivoted frame is pivoted to swing with the test part to gaging position in contact with the second gaging means or roll 19. The frame 11 pivots solely for insertion of the test part into gaging position between the gaging surface 15 and the gaging roll 19. Gaging position is on a line through the center of the pivot 12 and the center of the gaging roll 19. The roll 19 may have a single thread engaging ridge 26 or several as desired. The gaging roll is mounted for rotation on a stud 20 and is also mounted on the stud for substantial axial movement thereon to accommodate for differences in the pitch of threads or for lack of alignment of the external and internal thread of the same pitch.

Because of the shortness of a test piece it is difficult to turn the same in gaging position without means for turning a gaging roll. The roll 19 has shallow recesses 30 at the peak or tips of the gaging ridges 26 to provide projections 31 or roughness. The recess may be no more than two thousandths of an inch deep which gives sufficient irregularity so that the roll may be easily turned by the inspector's fingers. By turning the gaging roll 19 the test part T is rotated therewith while supported in gaging position to present the entire circumference of the test part to the gaging means. If there is gradual movement of the indicator as the test part is rotated through a half turn, variation in the wall thickness of the test part is indicated which variation is occassioned by eccentricity between the inner surface or thread and the outer surface or thread whatever the surface form may be on the test part. A sudden change in the indicator reading is indicative of another thread fault such as an irregularity.

Figure 3 illustrates the invention as applied to a different form of gage which however is basically the same as that of Figures 1 and 2. A gage frame or base 43 carries a movable frame 44, preferably pivoted and carried by a pivot 45 on the gage frame or base. This movable or pivoted frame carries the gaging pin 10 with its gaging surface 15 which supports and participates in gaging the test part T. A cooperating gaging roll 19 is rotatably mounted upon a stud 21 carried by an arm 46 forming a part of the gage base or frame. The gaging roll is mounted in spaced parallel relation to the gaging surface 15. An indicator 47 engages the pivoted frame 44, such as an extension 48 thereof and by observing the indicator the inspector determines the acceptability of the test piece.

The gaging roll 19 has means for rotating the same. Preferably the gaging roll carried by the arm 46 has thread gaging ridges 26 of the form shown in Figure 4. By rotating the gaging roll the test part is rotated in gaging position thereby presenting the entire circumference of the test part to the gaging means. The pivot means or studs for the gaging roll may be the same as that of Figure 1 and hence is similarly numbered. A spring 49 may press the pivoted frame and gaging means 10, 15 upwardly towards the gaging roll 19.

Note that in the construction of Figure 3, the pivoted frame 44 is depressed so that the test piece may be inserted on the gaging means 10, 15 whereupon the pivoted frame is released to bring the test piece into contact with the cooperating gaging roll 19 and the position of the gaging means 10, 15 or particularly the frame carrying the same is indicated by the indicator which indicates the acceptability of the test part. The pivoted frame 44 of this construction is, therefore, movable both for insertion of the test part between the gaging means and for providing the movement for performing the gaging function. It is immaterial which of the gaging means has the movement relatively to the other for insertion of the test part between the gaging means and to provide the gaging function or operation of the test part.

In the gages described herein, the external gaging means is a gaging roll which has means for rotation of the same so that the test part when in gaging position is rotated thereby to present its entire circumference to the gaging means. In all constructions illustrated there is at least one movable frame, preferably pivoted, enabling insertion of the test part between the gaging means at gaging position where the test part is supported by the gaging means and rotated by a gaging roll of the gaging means.

This invention is presented to fill a need for improvements in gage for rotating test part for peripheral and concentricity gaging. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for testing the centricity between an internal and a larger external surface providing a wall having thickness comprising a gage frame, a first gaging means carried by the gage frame for engaging a portion of the internal surface of the test part and having a length approximating the length of the test part, a second gaging means carried by the gage frame for engaging the external surface of the test part and located adjacent to the first gaging means and spaced therefrom a distance comparable to the wall thickness of the test part to receive the wall therebetween, the second gaging means having a length approximating the length of the test part and cooperating with the first gaging means to provide the sole support for a test part in gaging position and to gage the test part, at least one of the gaging means being a gaging roll, means mounting the gaging roll for rotation, means to rotate the gaging roll which thereby rotates the test part in gaging position, means mounting at least one of the gaging means for movement toward and away from the other to insert a test part between the gaging means and to gage the test part, and an indicator carried by the gage frame and connected with the gaging means having a gaging movement.

2. A gage for testing the centricity between an internal and a larger external surface providing a wall having thickness comprising a gage frame, a first gaging means carried by the gage frame for engaging a portion of the internal peripheral surface of the test part, the first gaging means being a pin having a gaging surface to engage a portion of the internal surface and having a length approximating the length of the test part, a second gaging means carried by the gage frame for engaging the external surface of the test part and located adjacent to the first gaging means and spaced therefrom a distance comparable to the wall thickness of the test part to receive the wall therebetween, the second gaging means having a length approximating the length of the test part and cooperating with the first gaging means to provide the sole support for a test part in gaging position and to gage the test part, the second gaging means being a gaging roll, means mounting the gaging roll for rotation, means to rotate the gaging roll which thereby rotates the test part in gaging position, means mounting at least one of the gaging means for movement toward and away from the other to insert a test part between the gaging means and to gage the test part, and an indicator carried by the gage frame and connected with the gaging means having a gaging movement.

3. A gage for testing the centricity between an internal and an external threaded surface comprising a gage frame, a pivot carried by the gage frame, a pivoted frame mounted on the pivot, a gaging pin carried by the pivoted frame spaced from the pivot therefor, a portion of a thread carried by the gaging pin conforming to the internal thread for engaging a portion of the internal thread of the test part, a second pivot carried by the gage frame, a pivoted frame carried by the second pivot, a gaging roll stud carried by the second pivoted frame spaced from the frame pivot, a gaging roll carried by the stud for rotation and axial movement thereon for engaging the external threaded surface of the test part and cooperating with the first gaging means to support a test part in gaging position and to gage the test part, means to rotate the gaging roll which thereby rotates the test part in gaging position, and an indicator carried by the gage frame and engaging the second frame to indicate the position thereof and the gaging roll.

4. A gage for testing the centricity between an internal surface and an external threaded surface comprising a gage frame, a first gaging means carried by the gage frame for engaging an axially extending portion of the internal peripheral surface of the test part, a second gaging means carried by the gage frame for engaging the external thread of the test part and cooperating with the first gaging means to support a test part in gaging position and to gage the test part, the second gaging means being a gaging roll having thread gaging ridges around its periphery, means mounting the gaging roll for rotation, serrations on the peripheral peaks of the gaging ridges to rotate the gaging roll which thereby rotates the test part in gaging position, means mounting at least one of the gaging means for movement toward and away from the other to insert a test part between the gaging means and to gage the test part, and an indicator carried by the gage frame and connected with the gaging means having a gaging movement.

5. A gage as in claim 4 including a pivoted frame for movement to gaging position, pivotally mounted on the gage frame and carrying the first gaging means and the second gaging means being mounted for gaging movement towards and from the first gaging means to gage a test part.

6. A gage as in claim 4 including a pivoted frame pivotally mounted on the gage frame and carrying the first gaging means for movement to gaging position and to and from the gaging roll for gaging movement.

7. A gage for testing an internally and externally threaded test part having length comprising a gage frame, a pivot carried by the gage frame, a pivoted frame mounted on the pivot movable to and from gaging position, a gaging pin carried by the pivoted frame spaced from the pivot therefor, a first gaging means carried by the gaging pin having a threaded surface conforming to the internal thread on the test part for engaging the internal thread, a gaging roll stud, means mounting the gaging roll stud on the gage frame spaced from the frame pivot and the gaging pin when in gaging position and for movement towards and away from the first gaging means on the gaging pin, a gaging roll mounted on the stud for rotation thereon for engaging the external thread of the test part and cooperating with the first gaging means when in gaging position, and an indicator carried by the gage frame and engaging the mounting means to indicate the position of the gaging roll.

8. A gage for testing an internally and externally threaded test part comprising a gage frame, a pivot carried by the gage frame, a pivoted frame mounted on the pivot movable to and from gaging position, a gaging pin carried by the pivoted frame spaced from the pivot therefor, a first gaging means carried by the gaging pin having a threaded surface conforming to the internal thread on the test part for engaging the internal thread, a gaging roll stud, a second pivoted frame mounting the gaging roll stud on the gage frame spaced from the frame pivot and the gaging pin when in gaging position and for movement towards and away from the first gaging means on the gaging pin, a gaging roll mounted on the stud for rotation thereon for engaging the external thread of the test part and cooperating with the first gaging means when in gaging position, and an indicator carried by the gage frame and engaging the second pivoted frame to indicate the position of the gaging roll.

References Cited in the file of this patent

UNITED STATES PATENTS

| | | |
|---|---|---|
| 2,030,237 | Brittain, Jr. et al. | Feb. 11, 1936 |
| 2,770,050 | Johnson | Nov. 13, 1956 |